United States Patent
Watanabe et al.

(10) Patent No.: US 10,179,341 B2
(45) Date of Patent: Jan. 15, 2019

(54) ROLL MEMBER, COATING DEVICE, SEPARATOR PRODUCTION DEVICE, AND SECONDARY BATTER PRODUCTION DEVICE

(71) Applicant: SUMITOMO CHEMICAL COMPANY, LIMITED, Chuo-ku, Tokyo (JP)

(72) Inventors: Koichiro Watanabe, Niihama (JP); Jian Wang, Niihama (JP); Noboru Hayakawa, Niihama (JP); Yasutoshi Minemoto, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 15/491,140

(22) Filed: Apr. 19, 2017

(65) Prior Publication Data
US 2017/0282204 A1   Oct. 5, 2017

Related U.S. Application Data

(63) Continuation of application No. 14/416,523, filed as application No. PCT/JP2013/071580 on Aug. 2, 2013, now Pat. No. 9,656,285.

(30) Foreign Application Priority Data

Aug. 6, 2012  (JP) ................................. 2012-174021

(51) Int. Cl.
*B05C 1/08*    (2006.01)
*H01M 2/18*    (2006.01)
(Continued)

(52) U.S. Cl.
CPC .......... *B05C 1/0817* (2013.01); *B05C 1/0808* (2013.01); *B05C 1/0826* (2013.01);
(Continued)

(58) Field of Classification Search
USPC ............... 156/390, 499, 537, 547, 548, 549; 118/68, 600, 211; 492/30, 31, 33, 34
See application file for complete search history.

(56) References Cited

U.S. PATENT DOCUMENTS 4,216,289 A    8/1980  Oda et al.
4,227,452 A    10/1980 Tamai
(Continued)

FOREIGN PATENT DOCUMENTS

JP    61-75870 U    5/1986
JP    11-5052 A     1/1999
(Continued)

OTHER PUBLICATIONS

International Search Report for PCT/JP2013/071580 dated Nov. 12, 2013.
(Continued)

*Primary Examiner* — Sing P Chan
(74) *Attorney, Agent, or Firm* — Sughrue Mion, PLLC

(57) ABSTRACT

A roll member having an outer circumferential surface in which a plurality of grooves are formed, wherein the plurality of grooves are arranged at an angle relative to a direction parallel to a central axis of the roll member. A coating device for coating a film member with a coating liquid, the coating device comprising the roll member. A separator production device for producing a separator in which a heat-resistant layer is laminated over a substrate. The separator production device comprising the coating device. A secondary battery production device for producing a secondary battery comprising a positive electrode plate, a
(Continued)

negative electrode plate, and a pair of separators that sandwich the positive electrode plate or the negative electrode plate therebetween. The secondary battery production device comprising the separator production device.

10 Claims, 11 Drawing Sheets

(51) Int. Cl.
*H01M 2/16* (2006.01)
*H01M 2/14* (2006.01)
*H01M 10/04* (2006.01)

(52) U.S. Cl.
CPC ......... *H01M 2/145* (2013.01); *H01M 2/1653* (2013.01); *H01M 2/1686* (2013.01); *H01M 2/18* (2013.01); *H01M 10/0404* (2013.01); *B05C 1/083* (2013.01)

(56) References Cited

U.S. PATENT DOCUMENTS

2006/0138693 A1 6/2006 Tuman et al.
2007/0007883 A1 1/2007 Takeda et al.

FOREIGN PATENT DOCUMENTS

| JP | 2003-2360393 A | 9/2003 |
| JP | 2004-199924 A | 7/2004 |
| JP | 2011-5454 A | 1/2011 |
| JP | 2011-159434 A | 8/2011 |

OTHER PUBLICATIONS

Machine-generated translation of JP 11-005052 A to Toppan Printing Co., Ltd. published Jan. 12, 1999.
Machine-generated translation of JP 2003-260393 A to Fuji Photo Film Co., Ltd., et al. published Sep. 16, 2003.
Machine-generated translation of JP 2004-199924 A to Matsushita Electric Ind. Co., Ltd. published Jul. 15, 2004.
Machine-generated translation of JP 2007-061709 A to Fujifilm Corp. published Mar. 15, 2007.
Machine-generated translation of JP 2011-005454 A to Dainippon Printing Co., Ltd. published Jan. 13, 2011.
Machine-generated translation of JP 2011-159434 A to Toyota Motor Corp. published Aug. 18, 2011.
Translation of Model Laid-open Publication No. S61-75870 to Toppan Printing Co. published May 22, 1986.

ROLL MEMBER, COATING DEVICE, SEPARATOR PRODUCTION DEVICE, AND SECONDARY BATTER PRODUCTION DEVICE

CROSS-REFERENCE TO RELATED APPLICATIONS

This application is a continuation of U.S. patent application Ser. No. 14/416,523, filed Jan. 22, 2015 (now allowed), which is a 371 National Stage Entry of International Application No. PCT/JP2013/071580 filed Aug. 2, 2013, claiming priority based on Japanese Patent Application No. 2012-174021, filed Aug. 6, 2012. The entire disclosures of the prior applications are considered part of the disclosure of the accompanying continuation application, and are hereby incorporated by reference.

TECHNICAL FIELD

The present invention relates to a roll member, a coating device, a separator production device, and a secondary battery production device.

BACKGROUND ART

Hitherto, as a method for coating a film member with a functional film, there have been known dry coating, wet coating, laminate coating and other methods. Out of these methods, wet coating has been used, which makes use of a slot die, a Meyer bar, a gravure or some other that can make coating at low costs.

Out of wet coating species, gravure coating has been used in various fields, the coating being excellent in producing performance, maintenance performance, or handleability. Gravure coating is a method of filling a coating fluid into a vessel called a pan, bringing the coating fluid into contact with a gravure roll having a grooved surface while rotating the roll to transfer the coating fluid held on the surface to a film member.

In the meantime, depending on a product to be coated, it may be unnecessary to coat the entire surface of the product to be coated with a coating fluid in accordance with various purposes. For example, there may be a case where a region on which no coating fluid is coated is formed in a film member to have a predetermined width in the running direction of the film member. Patent Document 1 discloses the use of a gravure roll in which gravure grooves are not formed at sites corresponding to a region on which no coating fluid is coated. However, a coating fluid may unfavorably move along an inclination direction of the gravure grooves so that the coating fluid may deposit between a coated region and an uncoated region. Thus, therein, a portion large in film thickness may be generated (high-edge phenomenon). When the high-edge phenomenon is generated, wrinkles or others are generated in the film member, which is a wound member, so that the member may not be usable for a product or the next step. Thus, a demand for techniques for restraining the generation of the high-edge phenomenon has been increased.

In response to this demand, for example, Patent Document 2 discloses a bar coating device for coating a long flexible support that is continuously running (hereinafter referred to as a web) with a coating liquid. The bar coating device has a columnar coating bar having an outer circumferential surface in which a spiral groove is formed. As the coating bar, a bar is used in which portions corresponding to outsides of both end portions in the width direction of the web are smaller in depth than a portion corresponding to the inside of both of the end portions in the width direction of the web.

PRIOR ART DOCUMENT

Patent Documents

Patent Document 1: JP-A-2011-159434
Patent Document 2: JP-A-2007-61709

DISCLOSURE OF THE INVENTION

It is stated that such a configuration makes it possible to restrain the generation of the high-edge phenomenon. However, it is difficult to use a doctor blade, which regulates a coating amount of a coating fluid when the coating bar changes in outer diameter. Moreover, the grooves are made to be extended over the end portions of the web, so that a liquid pool is generated in accordance with the viscosity, the surface tension or some other physical property of the coating liquid. As a result, the high-edge may be generated after the coating fluid is dried.

In light of such a situation, the present invention has been made. An object of the invention is to provide a roll member, a coating device, a separator production device, and a secondary battery production device that are capable of restraining the generation of a high-edge phenomenon and further forming a coated film evenly onto a surface of a substrate.

In order to attain the object, the roll member of the present invention is a roll member having an outer circumferential surface in which a plurality of grooves are formed, wherein the plurality of grooves are arranged at an angle relative to a direction parallel to a central axis of the roll member; in the outer circumferential surface of the roll member, there are provided a processing region where the plurality of grooves are formed and a non-processing region where the plurality of grooves are not formed; the processing region has a first processing region provided in one end portion in a width direction of the processing region parallel to the central axis, a second processing region provided in the other end portion in the width direction of the processing region, and a third processing region that is a processing region other than the first and second processing regions; grooves in the third processing region are even in depth; grooves in the first processing region are smaller in depth than the grooves in the third processing region; the depth of the grooves in the first processing region gradually decreases as the distance from the one end portion in the width direction of the processing region decreases; grooves in the second processing region are smaller in depth than the grooves in the third processing region; the depth of the grooves in the second processing region gradually decreases as the distance from the other end portion in the width direction of the processing region decreases; and a first length that is the length of the first processing region in the direction parallel to the central axis is different from a second length that is the length of the second processing region in the direction parallel to the central axis.

The roll member of the present invention is a roll member having an outer circumferential surface in which a plurality of grooves are formed, wherein the plurality of grooves are arranged at an angle relative to a direction parallel to a central axis of the roll member; in the outer circumferential surface of the roll member, there are provided a processing region where the plurality of grooves are formed, and a non-processing region where the plurality of grooves are not formed; the processing region has a first processing region provided in one end portion in a width direction of the processing region parallel to the central axis, and a fourth processing region that is a processing region other than the first processing region of the processing region; grooves in the fourth processing region are even in depth; grooves in the first processing region are smaller in depth than the grooves in the fourth processing region; and the depth of the grooves in the first processing region gradually decreases as the distance from the one end portion in the width direction of the processing region decreases.

The roll member of the present invention satisfies the following expression (1):

$$50/3 \leq (L/d) \leq 1000/3 \quad (1)$$

wherein d represents the depth of a groove formed in the first processing region and located farthest away from the one end portion of the first processing region, and L represents the length of the first processing region in the direction parallel to the central axis.

According to the roll member of the present invention, in the outer circumferential surface of the roll member, a plurality of rows of the processing region and a plurality of rows of the non-processing region are arranged alternately along the direction parallel to the central axis.

The coating device of the present invention is a coating device for coating a film member with a coating liquid, the device including the roll member rotatably arranged around a central axis; a supplier for supplying the coating liquid to an outer circumferential surface of the roll member; and a blade member for scraping a surplus of the coating liquid that has attached to the outer circumferential surface of the roll member, wherein the blade member is configured to come into contact with the processing region and the non-processing region of the roll member, thereby scraping a surplus of the coating liquid that has attached to the processing region, and further scraping the coating liquid that adheres to the non-processing region to remove the whole of the coating liquid in the non-processing region.

In the coating device, a tip portion of the blade member, the tip portion being to come into contact with the roll member, is in the form of a straight line parallel to the central axis.

In the coating device, the blade member is smaller in elastic modulus than the roll member.

In the coating device, the roll member is made of a metallic material, and the blade member is made of a resin material.

The separator production device of the present invention is a separator production device for producing a separator in which a heat-resistant layer is laminated over a substrate, the device including the coating device, and a drying device for drying a coating liquid containing a material for forming the heat-resistant layer and transferred to a film member that is to become the substrate with the coating device.

The secondary battery production device of the present invention is a secondary battery production device for producing a secondary battery including a positive electrode plate, a negative electrode plate, and a pair of separators sandwiching the positive electrode plate or the negative electrode plate therebetween, the device including the separator production device for producing a pair of separators; a stacking device which sandwiches the positive electrode plate or the negative electrode plate between the pair of separators produced with the separator production device; and a heating device which heats peripheral edge portions of the pair of separators sandwiching the positive electrode plate or the negative electrode plate therebetween, to weld the paired separators to each other; wherein the separator production device is a device with which the coating liquid held in the processing region of the roll member is transferred to a central portion of the substrate of each of the separators and thereby the separators are produced, the separators each having, in a central portion thereof, a layer-formed-region in which the heat-resistant layer is formed, and further having, in a peripheral edge portion, a layer-nonformed-region in which the heat-resistant layer is not formed; the stacking device is a device which arranges the pair of separators such that the layer-formed-regions of the pair of separators are superimposed on the positive electrode plate or the negative electrode plate; and the heating device is a device which heats the layer-nonformed-regions of the separators, each of the regions not being superimposed on the positive electrode plate or the negative electrode plate, thereby welding the pair of separators thermally to each other.

MODE FOR CARRYING OUT THE INVENTION

Hereinafter, with reference to the drawings, embodiments of the present invention will be described. However, the invention is not limited to the following embodiments.

In each of the entire drawings referred to hereinafter, the respective dimensions, scale ratios and others of individual constituting elements therein are appropriately made different from each other for brevity of the drawings. Moreover, in the following description and the drawings, the same reference sign is attached to elements identical or equivalent to each other, and thus any overlapped description thereon is omitted.

First Embodiment

Figure 1:
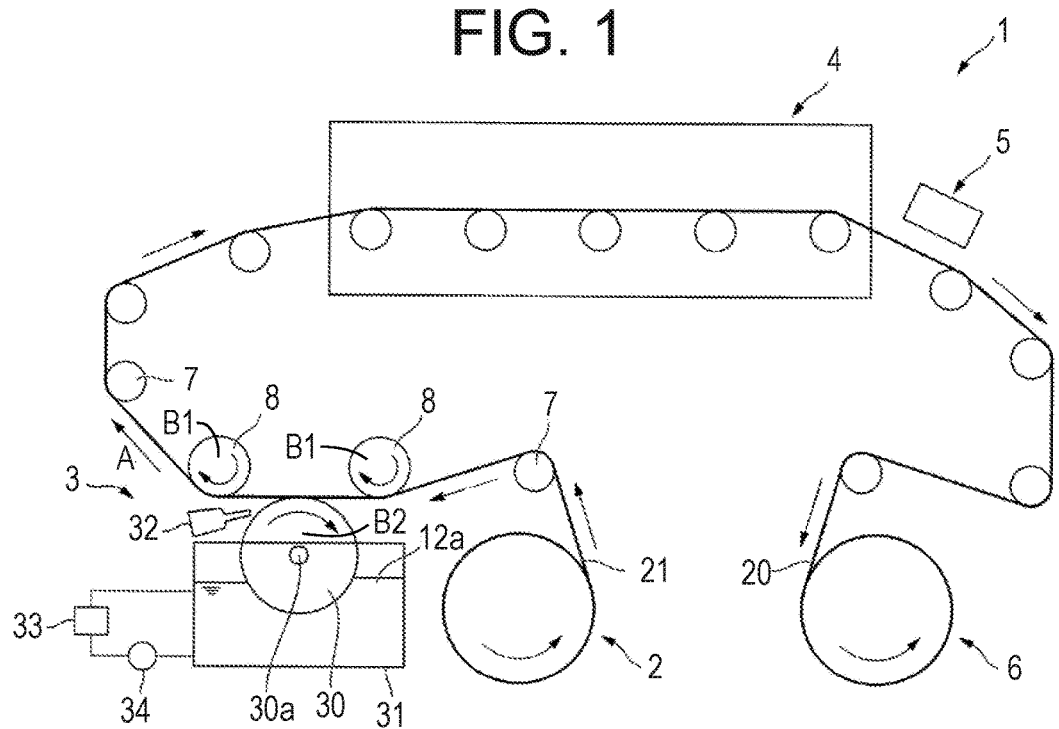
FIG. 1 is a schematic view illustrating a separator production device of a first embodiment of the present invention.

FIG. 1 is a schematic view illustrating a separator production device 1 of a first embodiment of the present invention. The separator production device 1 is a device for producing, for example, a separator in which a heat-resistant layer made of, for example, aramid resin or ceramics is laminated on a surface of a porous substrate made of, for example, polyethylene.

As illustrated in FIG. 1, the separator production device 1 of the present embodiment has a holding roll 2, a coating device 3, a drying/hardening unit (drying unit) 4, an inspecting unit 5, a winding roll 6, transporting rolls 7, and tension rolls 8.

In the present embodiment, the wording "transporting rolls" denotes roll-form members used to transport a film member 21. The transporting rolls 7 are arranged between the holding roll 2, which is arranged at the most upstream side of a path for transporting the film member 21, and the winding roll 6, which is arranged at the most downstream side thereof.

In the present embodiment, the wording "film member" is a strip-shaped member from which substrates 11 (see FIG. 2) each constituting a separator 10 are to be cut out. In other words, the film member 21 is a material which is to become the substrates 11, which each constitute the separator 10. In the embodiment, as the film member 21, a member is used which has a width about three times that of the substrate 11 of the separator 10 (see FIG. 12(A)).

Figure 2:
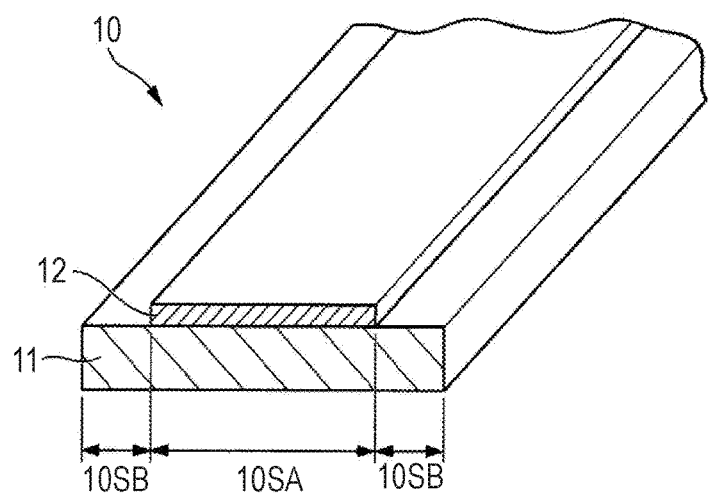
FIG. 2 is a partially-sectional perspective view of a strip-shaped separator.

FIG. 2 is a partially-sectional perspective view of the strip-shaped separator 10 in the present embodiment.

As illustrated in FIG. 2, the separator 10 in the present embodiment is a band-from separator in which the heat-resistant layer 12 is formed on the substrate 11. The separator 10 is, for example, an insulator wound between a positive electrode plate and a negative electrode plate in a secondary battery in a wound form.

Hereinafter, regarding the substrate 11, the heat-resistant layer 12, the separator 10 or any other strip-shaped member, a direction in which the member is wound refers to the longitudinal direction thereof (backward direction in FIG. 2), and a direction thereof orthogonal to the longitudinal direction refers to the width direction thereof (right and left direction in FIG. 2). In FIG. 2, the thickness direction of the separator 10 (vertical direction in FIG. 2) is illustrated in an enlarged manner. However, the actual thickness thereof is very small relatively to the size in the width direction.

In the separator 10 in the present embodiment, the heat-resistant layer 12 is formed to have a substantially even thickness on one of both surfaces of the substrate 11. The heat-resistant layers 12 may be formed on both the surfaces of the separator 10, respectively, which is not illustrated.

The substrate 11 of the separator 10 in the present embodiment is made of a resin material having electrically insulating property. As the substrate 11, for example, a porous film made of a polyolefin resin such as polyethylene or polypropylene, a fluororesin, a nitrogen-containing aromatic polymer, or the like is usable. The substrate may be a substrate in which two or more of these materials are used, or a laminated substrate in which two or more layers different from each other in material are laminated onto each other. When the layers are laminated, the layers may be different from each other in porosity.

The heat-resistant layer 12 is made of a material having electrically insulating property and having larger in heat resistance than the substrate 11. For the heat-resistant layer 12, for example, ceramics such as alumina, or a high melting point resin such as aramid resin is usable. In the present embodiment, the thickness of the heat-resistant layer 12 is smaller than that of the substrate 11, and is, for example, from about $\frac{1}{2}$ to $\frac{1}{6}$ of that of the substrate 11.

The thickness of the separator 10 may be small as much as possible so long as the thickness permits the secondary battery to keep mechanical strengths since the secondary battery is raised in energy density and made small in internal resistance. The thickness of the separator 10 is preferably from about 10 to 200 μm, more preferably from about 10 to 30 μm, even more preferably from about 10 to 20 μm.

In the present embodiment, as a method for forming the heat-resistant layer 12 on the substrate 11, a method is adopted in which alumina made into an aqueous coating liquid 12a with a solvent containing water is coated on the substrate 11 by gravure coating.

In the present embodiment, the heat-resistant layer 12 is smaller in width than the substrate 11. In the front surface of the substrate 11, a layer-formed-region 10SA where the heat-resistant layer 12 is formed is a region to which the coating liquid 12a has been transferred by the rotational operation of a roll member 30 of the coating device 3. The size of the layer-formed-region 10SA is a size corresponding to each of processing regions 30SA (see FIGS. 3(A) and 3(B)) of the roll member 30.

In both end portions in the width direction of the separator 10, layer-nonformed-regions 10SB where the heat-resistant layer 12 is not formed are provided, respectively. The layer-nonformed-regions 10SB are regions where the coating liquid 12a has not been transferred by the rotational operation of the roll member 30 of the coating device 3. The layer-nonformed-regions 10SB are regions to which the separator 10 is subjected to welding in the process for producing a secondary battery. The size of each of the layer-nonformed-regions 10SB is a size corresponding to each of non-processing regions 30SB of the roll member 30 (see FIGS. 3(A) and 3(B)). Each of the layer-nonformed-regions 10SB is smaller in width than the layer-formed-region 10SA. The width of the layer-nonformed-region 10SB is set to, for example, 0.1 mm or more, more preferably 1 mm or more.

For example, in a lithium ion secondary battery, its positive electrode and negative electrode are each formed by coating a metal foil piece with a mixture of active materials for the electrodes. When the separator 10 in the present embodiment is used in such a lithium ion secondary battery, it is desired that the heat-resistant layer 12 is larger in width than the mixture of the active materials for each of the positive electrode and negative electrode.

In the separator 10 in the present embodiment, it is preferred that regions where the heat-resistant layer 12 is not formed are intermittently provided also in the longitudinal direction of the separator 10. When the separator 10 in the embodiment is used in, for example, a lithium ion secondary battery, in each of locations of the separator 10 that correspond to the start and the end of the winding of the separator, the substrate 11 may be made naked in a region extended to some degree over the whole in the width direction of the separator. The length of the separator 10 used for a secondary battery is appropriately selected in accordance with a use application, and others.

Returning to FIG. 1, the holding roll 2 is provided in the state that the strip-shaped film member 21 is wound thereon. The film member 21 is unwound from the holding roll 2 to be fed out, and a tension is given thereto through the tension rolls 8. The tension rolls 8 are each rotated in a direction represented by an arrow B1 (clockwise), thereby transporting the film member 21 into a direction represented by an arrow A. The film member 21 fed out from the tension rolls 8 is wound onto the winding roll 6.

The coating device 3 is arranged at a side of the film member 21 that is opposite to the tension roll 8 side of the film member 21. The coating device 3 is a device for coating the film member 21 fed out from the holding roll 2 with the coating liquid 12a containing the material for forming the heat-resistant layer 12. The coating device 3 of the present embodiment is so-called a roll coater, in which the coating liquid 12a is supplied onto a surface of the roll member 30 and then the coating liquid 12a that adheres to the surface of the roll member 30 is transferred onto the film member 21. In the embodiment, a direct roll coater is used which is a roller of transferring the coating liquid 12a supplied onto the surface of the roll member 30 directly onto the film member 21.

The roll coater is not limited to this roller, and may also be a reverse roll coater. The reverse coater is composed of, for example, a coating roll, a backup roll, and a metering roll. This reverse roll coater is a coater of adjusting an arrangement interval between the coating roll and the metering roll to adjust the amount of the coating liquid supplied to the coating roll, thereby locating a desired amount of the coating liquid onto the film member.

The roll coater may also be a knife roll coater. The knife roll coater is composed of, for example, a coating roll, a backup roll, and a knife roll. This knife roll coater is a coater of using a knife roll, which is a metallic plate having a sharp tip, to scrape a surplus of the coating liquid that has attached to the film member, thereby locating a desired amount of the coating liquid onto the film member.

The coating device 3 of the present embodiment includes the roll member 30, a supplier 31, a blade member 32, a tank 33, and a pump 34.

The roll member 30 is a member for coating the film member 21 with the coating liquid 12a by the rotational operation of the film member 21. The roll member 30 partially contacts a region of the film member 21 that is positioned between the two tension rolls 8. The roll member 30 is rotatably supported by a supporting mechanism not illustrated. The tension rolls 8 are movable to be freely shifted forward and backward (in the vertical directions in FIG. 1) against the film member 21. By adjusting the moving quantity of the tension rolls 8, the force of the roll member 30 for pressing the film member 21 can be adjusted.

The roll member 30 is connected to an actuator through a driving power transmitting mechanism not illustrated, and receives driving power from the actuator to rotate around a central axis 30a. As represented by an arrow B2, the roll member 30 is rotated in a direction reverse (clockwise) to the transporting direction of the film member 21. The rotating direction of the roll member 30 is not limited to this direction, and may be a direction (anticlockwise) identical with the transporting direction of the film member 21.

The supplier 31 is a section for supplying the coating liquid 12a to the roll member 30. The coating liquid 12a is housed in the supplier 31. The roll member 30 is partially immersed in the coating liquid 12a housed in the supplier 31. The supplier 31 is connected through a supplying path to the tank 33 and the pump 34. The tank 33 is a member in which the coating liquid 12a to be supplied to the supplier 31 is housed. The pump 34 is a member for pressure-supplying the coating liquid 12a from the tank 33 to the supplier 31.

In the middle of the supplying path from the tank 33 to the supplier 31, a filter may be provided for removing impurities and coagula contained in the coating liquid 12a.

The configuration for supplying the coating liquid 12a to the roll member 30 is not limited to the configuration of the supplier 31 illustrated in FIG. 1. In other words, various configurations are adoptable so long as the coating liquid 12a can be supplied to the roll member 30.

Figure 3A:
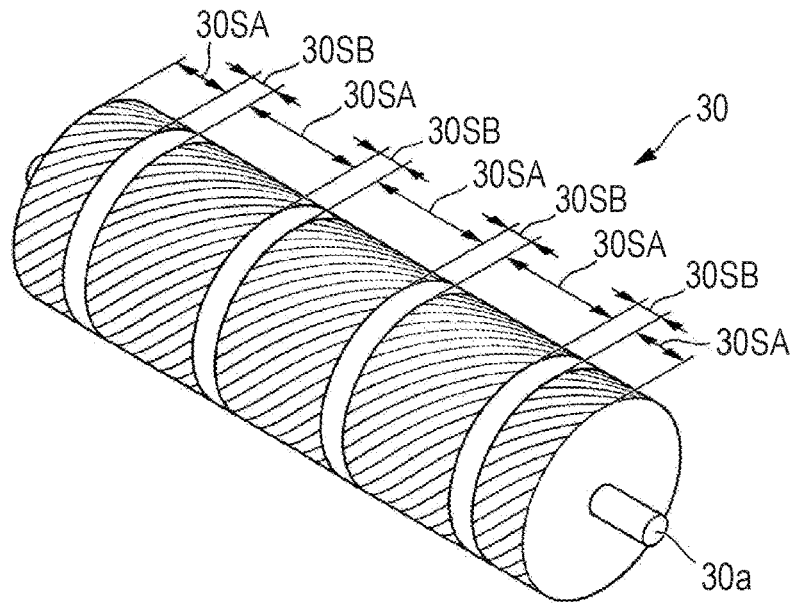
FIGS. 3(A) to 3(C) are schematic views illustrating a roll member of the first embodiment of the present invention.
Figure 3B:
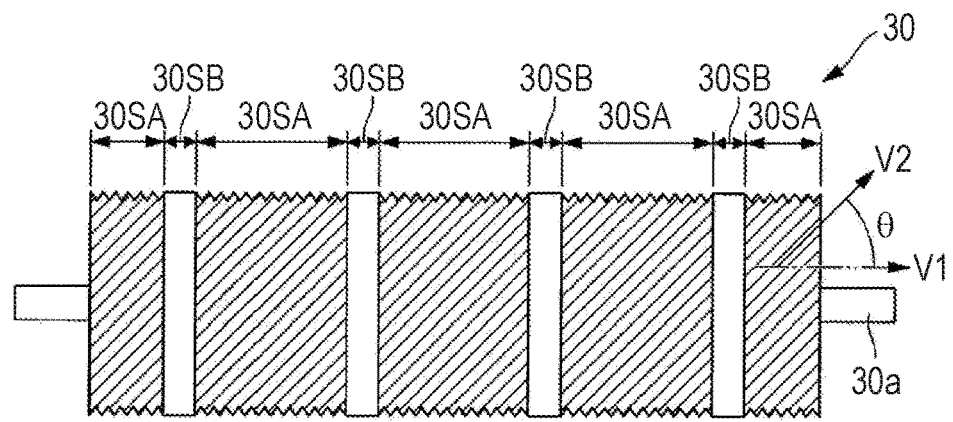
Figure 3C:
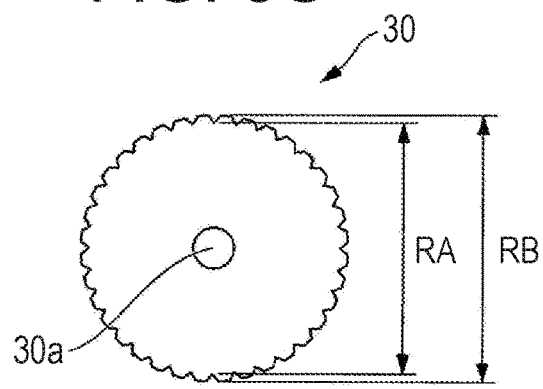

FIGS. 3(A) to 3(C) are schematic views illustrating the roll member 30 of the present embodiment. FIG. 3(A) is a perspective view; FIG. 3(B) is a plan view; and FIG. 3(C) is a side view.

As illustrated in FIGS. 3(A) and 3(B), a plurality of fine grooves (gravure patterns) are formed in the outer circumferential surface of the roll member 30. The plurality of grooves are arranged at an angle relative to a direction V1 parallel to the central axis 30a of the roll member 30. The angle θ made between the direction V1 parallel to the central axis 30a and an inclination direction V2 of the grooves (hereinafter referred to as the inclination angle of the grooves) is, for example, about 45°.

In the outer circumferential surface of the roll member 30, there are provided the processing regions 30SA, in each of which a plurality of fine grooves (gravure patterns) are formed, and the non-processing regions 30SB, in each of which a gravure pattern is not formed. The non-processing regions 30SB each have a flat and smooth surface.

In the roll member 30, the gravure patterns of the processing regions 30SA can hold the coating liquid 12a. Specifically, when the roll member 30 is rotated, the coating liquid 12a has attached onto the gravure patterns in the processing regions 30SA that are being immersed in the coating liquid 12a in the supplier 31.

When the roll member 30 is rotated while pushed onto the film member 21 in the state that the coating liquid 12a has attached onto the processing regions 30SA, the processing regions 30SA holding the coating liquid 12a are brought into contact with the film member 21 so that the coating liquid 12a on the processing regions 30SA is transferred onto the film member 21. In this way, the coating liquid 12a is coated on the film member 21.

In the outer circumferential surface of the roll member 30, a plurality of rows of the processing regions 30SA and a plurality of rows of the non-processing regions 30SB are arranged alternately along the direction parallel to the central axis 30a. In the present embodiment, the number of the arranged processing regions 30SA is 5 while that of the arranged non-processing regions 30SB is 4. The number of the arranged processing regions 30SA is not limited to this number. The number of the arranged processing regions 30SA may be, for example, from 1 to 4, or may be 6 or more.

It is preferred that the roll member 30 is made of a material larger in elastic modulus than the material of the blade member 32. The roll member 30 is made of, for example, a metallic material such as iron or stainless steel. On the other hand, the blade member 32 is made of a resin material such as a plastic material or rubber.

As illustrated in FIG. 3(C), the diameter RA of a portion where fine grooves are carved in each of the processing regions 30SA is smaller than the diameter RB of each of the non-processing regions 30SB (RA<RB). The difference between the diameters RA and RB is preferably 300 μm or less.

Figure 4:
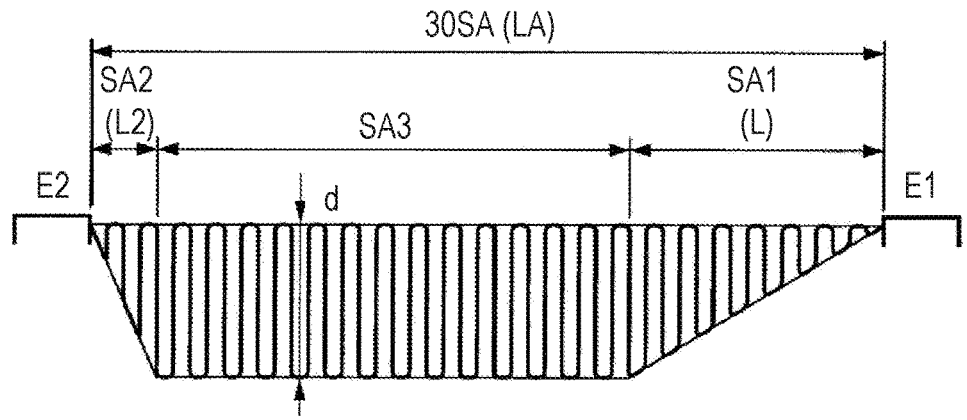
FIG. 4 is an enlarged view of a processing region of the roll member.

FIG. 4 is an enlarged view of the processing region 30SA of the roll member 30 of the present embodiment. FIG. 4 shows one processing region 30SA among a plurality of processing regions 30SA.

As illustrated in FIG. 4, the processing region 30SA of the roll member 30 of the present embodiment has a first processing region SA1, a second processing region SA2, and a third processing region SA3. The first processing region SA1 is provided in one end portion E1 in the width direction of the processing region 30SA parallel to the central axis 30a. The second processing region SA2 is provided in the other end E2 portion in the width direction of the processing region 30SA.

The third processing region SA3 is provided between the first processing region SA1 and the second processing region SA2. The third processing region SA3 is a processing region other than the first processing region SA1 and the second the processing region SA2.

The grooves in the third processing region SA3 are even in depth d. The depth d of the groove in the third processing region SA3 is, for example, about 150 μm.

The grooves in the first processing region SA1 are smaller in depth than those in the third processing region SA3. The depth of the grooves in the first processing region SA1 gradually decreases as the distance from the one end portion E1 in the width direction of the processing region 30SA decreases.

The grooves in the second processing region SA2 are smaller in depth than those in the third processing region SA3. The depth of the grooves in the second processing region SA2 gradually decreases as the distance from the other end portion E2 in the width direction of the processing region 30SA decreases.

A first length L as a length of the first processing region SA1 in the direction parallel to the central axis 30a is different from a second length L2 as a length of the second processing region SA2 in the direction parallel to the central axis 30a (L>L2).

A length LA as a length of the processing region 30SA in the direction parallel to the central axis 30a (hereinafter referred to as the total width of the processing region) is, for example, about 80 mm. The first length L is about 30 mm. The second length L2 is about 1 mm.

Figure 5:
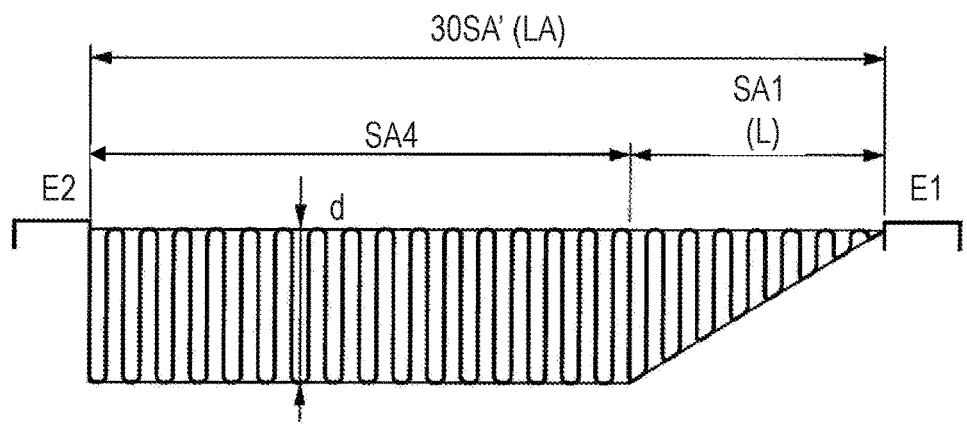
FIG. 5 is a view illustrating another example of the processing region of the roll member.

The configuration of each of the processing regions is not limited to this configuration. For example, a processing region 30SA' illustrated in FIG. 5 has two processing regions of a first processing region SA1 and a fourth processing region SA4. The first processing region SA1 is provided in one end portion E1 in the width direction of the processing region 30SA', and the fourth processing region SA4 is provided in another portion E2 in the width direction of the processing region 30SA'. The fourth processing region SA4 is a processing region other than the first processing region SA1.

The grooves in the fourth processing region SA4 are even in depth d. The depth d of the groove in the fourth processing region SA4 is, for example, about 150 μm.

The grooves in the first processing region SA1 are smaller in depth than those in the fourth processing region SA4. The depth of the grooves in the first processing region SA1 gradually decreases as the distance from the one end portion E1 in the width direction of the processing region 30A decreases. Such a configuration is also an embodiment of the present invention.

Figure 6:
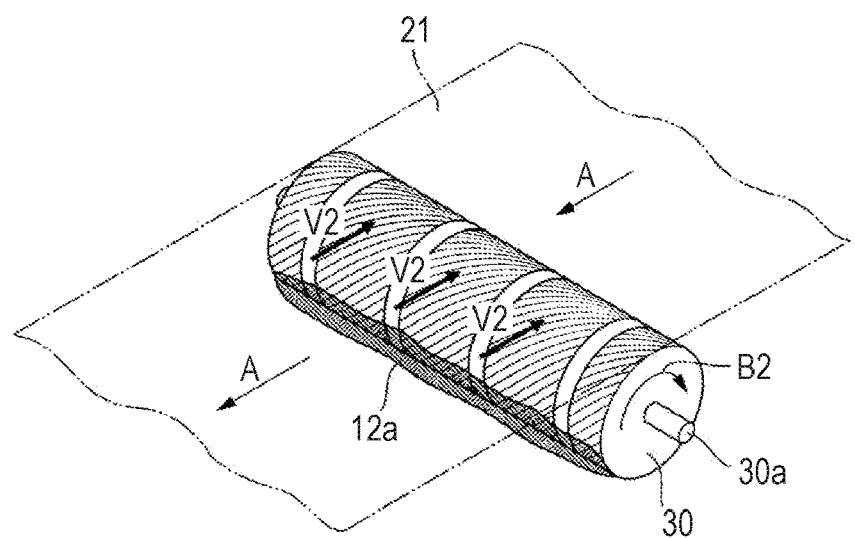
FIG. 6 is a view illustrating a situation in which a coating liquid is supplied to the roll member.

FIG. 6 is a view illustrating a situation in which the coating liquid 12a is supplied to the roll member 30 of the present embodiment. In FIG. 6, for convenience sake, the illustration of the supplier 31 and the blade member 32 is omitted.

As illustrated in FIG. 6, when the coating liquid 12a has been scraped by the rotational operation of the roll member 30, the coating liquid 12a spreads over the whole of the outer circumferential surface of the roll member 30. At this time, the coating liquid 21a flows along the inclination direction V2 of the grooves. In this case, the coating liquid 12a easily leans to an area of the processing region 30SA at the downstream side in the liquid-flowing direction of the region 30SA. On the other hand, the coating liquid 12a hardly leans to an area of the processing region 30SA at the upstream side in the liquid-flowing direction of the processing region 30SA. Thus, when the depth of the grooves in the whole of the processing region is made even, the coating liquid is excessively held in the area at the downstream side in the liquid-flowing direction of the processing region.

In the present embodiment, therefore, an area where grooves are shallow is formed in the area at the downstream side in the liquid-flowing direction of the processing region 30SA. Specifically, the area at the downstream side in the liquid-flowing direction of the processing region 30SA corresponds to the first processing region SA1. On the other hand, the area at the upstream side in the liquid-flowing direction of the processing region 30SA corresponds to the second processing region SA2.

In the present embodiment, the grooves in the first processing region SA1 are smaller in depth than those in the third processing region SA3, so that the amount of the coating liquid 12a held in the first processing region SA1 is smaller than that of the coating liquid 12a held in the third processing region SA3.

The depth of the grooves in the first processing region SA1 gradually decreases as the distance from the one end portion E1 in the width direction of the processing region SA decreases; thus, the thickness of the coating liquid 12a held in the first processing region SA1 gradually becomes smaller as a distance from the one end portion E1 in the width direction of the processing region 30SA is decreased.

The present inventors have made eager researches to find out that when the film member 21 with coated with the coating liquid 12a, a predetermined relationship exists between the degree of a high-edge portion of the heat-resistant layer 12 formed on the film member 21 and the value of the ratio of the first length L to the depth d (L/d). The high-edge portion is a convex portion formed in an end in the width direction of the heat-resistant layer 12 of the film member 21, and is a portion larger in thickness than the central portion of the heat-resistant layer. The depth d is the depth of the grooves formed in the first processing region and located farthest away from the first end portion E1 of the first processing region SA1. The depth d is substantially equal to the depth d of each of the third and fourth processing region SA3 and SA4.

Hereinafter, the relationship found out by the present inventors will be described with reference to FIGS. 7(A) to 7(D).

FIGS. 7(A) to 7(D) are views for describing a processing region and a high-edge portion of a heat-resistant layer in comparative example and working examples. In each of the working examples, the processing region has two processing regions of a first processing region SA1 and a fourth processing region SA4. In FIGS. 7(A) to 7(D), one of a plurality of processing regions is shown.

Figure 7A:
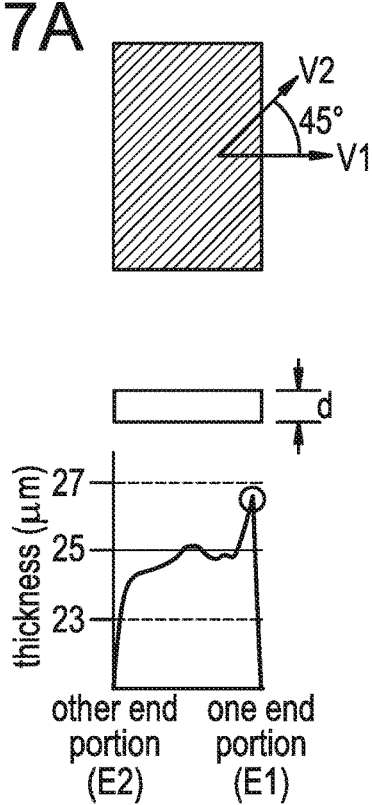
FIGS. 7(A) to 7(D) are views for describing a processing region and a high-edge portion of a heat-resistant layer in comparative example and working examples.
Figure 7B:
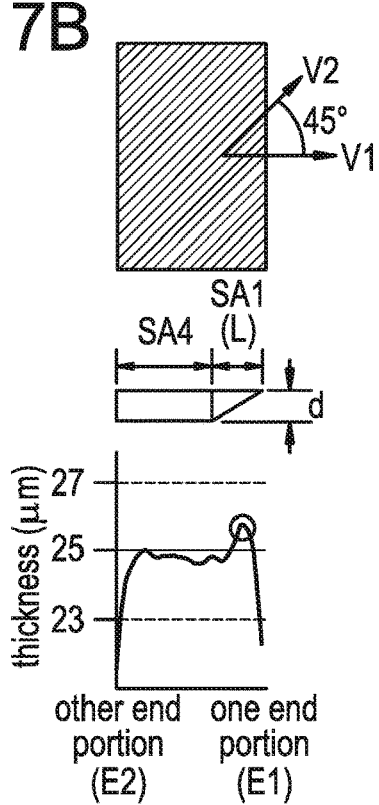
Figure 7C:
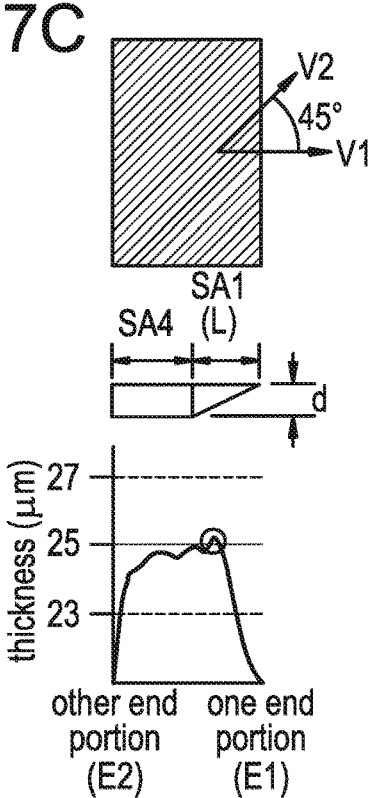
Figure 7D:
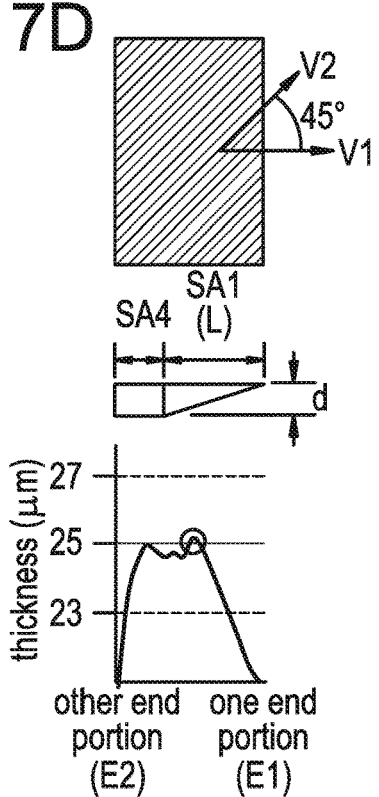

FIG. 7(A) is a view showing the comparative example. FIG. 7(B) is a view showing Example 1. FIG. 7(c) is a view showing Example 2. FIG. 7(D) is a view showing Example 3.

In each of FIGS. 7(A) to 7(D), a view at its upper position is a view of one region of the two processing regions, a view at its middle position is a view showing the inclination of the depth of grooves in the processing region, and a view at its lower position is a graph showing the degree of the high-edge portion in the heat-resistant layer. In the view at the lower position, the transverse axis represents the position in the width direction of the processing region. The vertical axis represents the thickness of the heat-resistant layer formed on the film member. The left side of the transverse axis corresponds to the other end portion E2 in the width direction of the processing region. The right side thereof corresponds to the one end portion E1 in the width direction of the processing region.

The samples used are each a sample in which the inclination angle θ of the grooves in the processing region is about 45°, as shown in the upper position in FIGS. 7(A) to 7(D).

As shown in the middle position in FIG. 7(A), in the comparative example, the sample used is a sample in which the grooves in the whole of the processing region are even in depth d. The depth d of the grooves is about 150 μm.

As illustrated in FIGS. 7(B) to 7(D), in each of the working examples, the sample used is a sample having the processing regions, which are the first processing region SA1 and the fourth processing region SA4. In the same way as in the comparative example, the depth d of the grooves in the fourth processing region SA4 is about 150 μm. Examples 1 to 3 are different from each other only in first length L.

In Example 1, the first length L is about 10 mm. In Example 2, the first length L is about 30 mm. In Example 3, the first length L is about 50 mm.

As illustrated in the lower position in FIG. 7(A), in the comparative example, a high-edge portion of the heat-resistant layer is remarkably conspicuous (circled portion in the figure). This would be because the coating liquid leans to an area at the downstream side in the liquid-flowing direction of the processing region.

The thickness of the thickest moiety of the high-edge portion of the heat-resistant layer is about 27 μm. The thickness of the central portion of the heat-resistant layer is about 25 μm. The difference between the maximum thickness of the high-edge portion and the thickness of the central portion is about 2 μm. This thickness difference would be within a thickness range allowable as a production accidental error before the film member, which has the surface on which the heat-resistant layer is formed, is wound onto the winding roll 6. However, after the film member is wound thereon, wrinkles and others are generated therein so that the film may not be used for a production or the next step.

As illustrated in the lower position in FIG. 7(B), in Example 1, a high-edge portion of the heat-resistant layer is less conspicuous (circled portion in the figure) than in the comparative example. The thickness of the thickest moiety of the high-edge portion of the heat-resistant layer is about 26 μm. The thickness of the central portion of the heat-resistant layer is about 25 μm. The difference between the maximum thickness of the high-edge portion and the thickness of the central portion is about 1 μm. Produced is a result that the thickness difference is smaller than in the comparative example.

As illustrated in the lower position in FIG. 7(C), in Example 2, a high-edge portion of the heat-resistant layer is hardly conspicuous (circled portion in the figure). The thickness of the thickest moiety of the high-edge portion of the heat-resistant layer is about 25.3 μm. The thickness of the central portion of the heat-resistant layer is about 25 μm. The difference between the maximum thickness of the high-edge portion and the thickness of the central portion is about 0.3 μm. The thickness difference is smaller than in Example 1.

As illustrated in the lower position in FIG. 7(D), in Example 3, a high-edge portion of the heat-resistant layer is hardly conspicuous (circled portion in the figure). However, the thickness in the width direction of the heat-resistant layer is small locally at both sides thereof. Accordingly, it is understood that when the first length L is made too large, the coating liquid is hardly held in the area at the downstream side in the liquid-flowing direction of the processing region.

It is preferred that the relationship represented by the following expression (1a) is satisfied in order to restrain a high-edge phenomenon:

$$5 \leq L \leq 50 \tag{1a}$$

Thus, from the expression (1a) and the depth d (d=150 μm), a relationship represented by the following expression (1) is satisfied:

$$50/3 \leq (L/d) \leq 1000/3 \tag{1}$$

As described above, it has been understood that when the film member 21 is coated with the coating liquid 12a, a predetermined relationship exists between the degree of the high-edge portion of the heat-resistant layer and the value of the ratio of the first length L to the depth d (L/d).

Figure 8A:
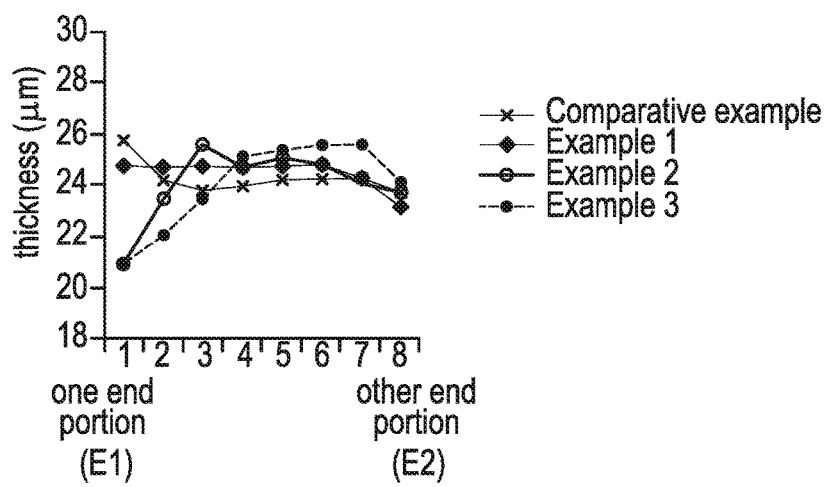
FIGS. 8(A) to 8(C) are graphs showing the thickness of the heat-resistant layer, which is formed on a film member in comparative example and the working examples, when a certain position in the longitudinal direction of the film member is measured.
Figure 8B:
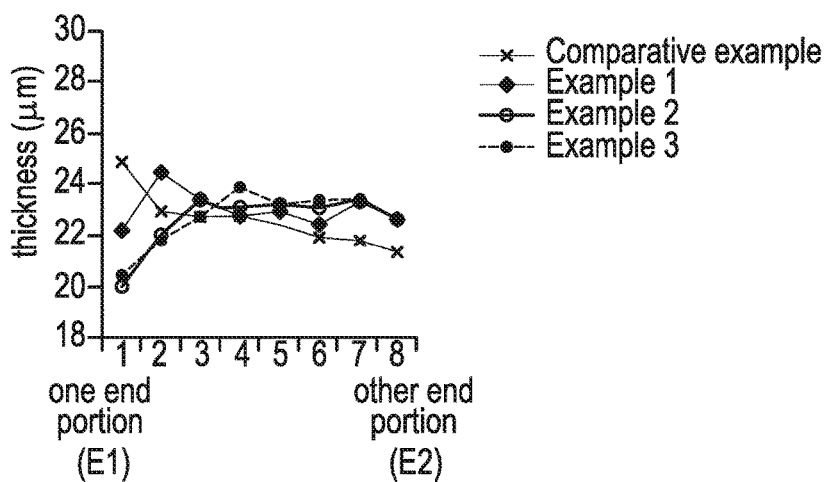
Figure 8C:
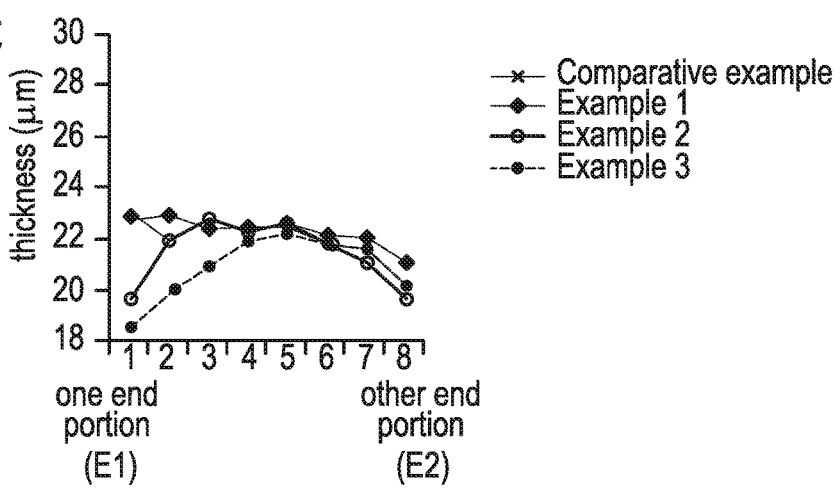

FIGS. 8(A) to 8(C) are graphs showing the thickness of the heat-resistant layer, which is formed on the film member in comparative example and the working examples, when a certain position in the longitudinal direction of the film member is measured. In FIGS. 8(A) to 8(C), the transverse axis represents the position in the width direction of one of the processing regions. The vertical axis represents the thickness of the heat-resistant layer formed on the film member. The transverse axis in each of FIGS. 8(A) to 8(C) is reverse to the transverse axis in the view at the lower position in each of FIGS. 7(A) to 7(D) in right and left sides in the width direction of the processing region. In FIGS. 8(A) to 8(C), the left side corresponds to the one end portion E1 in the width direction of the processing region. The right side corresponds to the other end portion E2 in the width direction of the processing region. Each pitch (each scale) in the transverse axis is 10 mm. The length in the longitudinal direction of the film member is set to about 1000 m.

FIG. 8(A) is a graph obtained when a point of the film member that is positioned about 300 m apart from a base end thereof is measured.

FIG. 8(B) is a graph obtained when a point of the film member that is positioned about 500 m apart from the base end thereof is measured. FIG. 8(C) is a graph obtained when a point (terminal end) of the film member that is positioned about 1000 m apart from the base end thereof is measured.

As illustrated in FIGS. 8(A) to 8(C), in the comparative example, the high-edge portion of the heat-resistant layer is thick locally at the one end portion E1.

By contrast, in Examples 1 to 3, the thickness of the heat-resistant layer gradually decreases as the distance from the one end portion E1 decreases.

In this way, a similar tendency is recognized about the respective thicknesses of the heat-resistant layers formed on the film members even when the measured positions in the longitudinal direction of each of the film members are varied from each other.

Figure 9A:
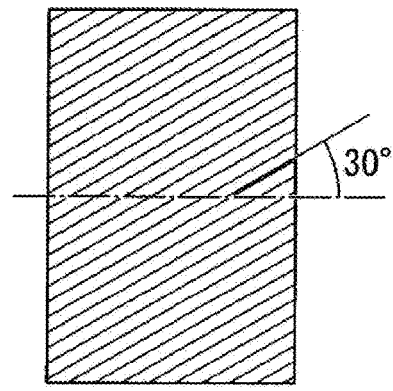
FIGS. 9(A) to 9(B) are views illustrating a different example of the inclination angle of grooves in the processing region.
Figure 9B:
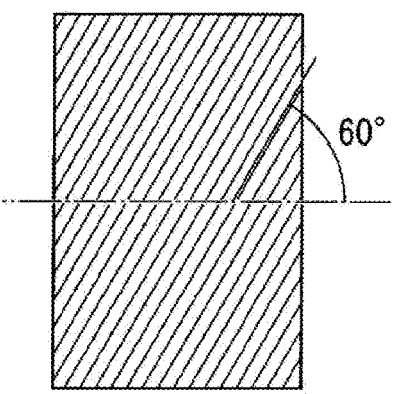

In the present embodiment, the case where the inclination angle θ of the grooves in the processing region is about 45° has been described as an example. However, the angle is not limited to this angle. As illustrated in FIG. 9(A), for example, a case where the inclination angle θ of the grooves in the processing region is about 30° is also an embodiment of the present invention. As illustrated in FIG. 9(B), a case where the inclination angle θ of the grooves in the processing region is about 60° is also an embodiment of the invention.

Figure 10:
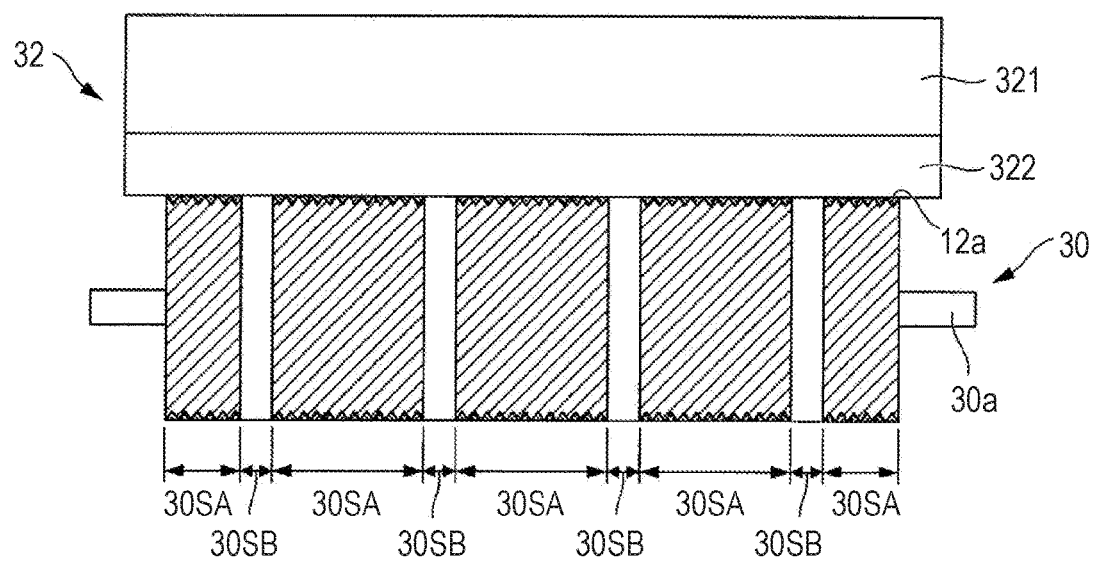
FIG. 10 is a view illustrating a positional relationship between a roll member and a blade member.

FIG. 10 is a view illustrating a positional relationship between the roll member 30 and the blade member 32 of the present embodiment.

As illustrated in FIG. 10, the blade 32 is brought into contact with the outer circumferential surface (the processing regions 30SA and the non-processing regions 30SB) of the roll member 30 to scrape a surplus of the coating liquid 12a that has attached to the processing regions 30SA, and further to scrape the coating liquid 12a that has attached to the non-processing regions 30SB so that the whole of the coating liquid 12a in the non-processing regions 30SB is removed. The blade member 32 has a body portion 321, and an edge portion 322, which is a portion so as to contact the surface of the roll member 30 (portion opposite to the roll member 30). The edge portion 322 of the blade member 32 is formed to contact the non-processing regions 30SB of the roll member 30. The edge portion 322 of the blade member 32 is in the form of a straight line parallel to the central portion 30a.

Regarding the blade member 32, at least the edge portion 322 is preferably made of a material smaller in elastic modulus than the roll member 30. When the roll member 30 is made of, for example, a metallic material such as iron or stainless steel, at least the edge portion 322 of the blade member 32 is made of a resin material such as a plastic material or rubber.

The viscosity of the coating liquid 12a is preferably set to 0.1 Ps or less. If the viscosity of the coating liquid 12a is more than 0.1 Ps, decreased is the effect of scraping the coating liquid 12a that adheres to the non-processing regions 30SB by the blade member 32.

Figure 11A:
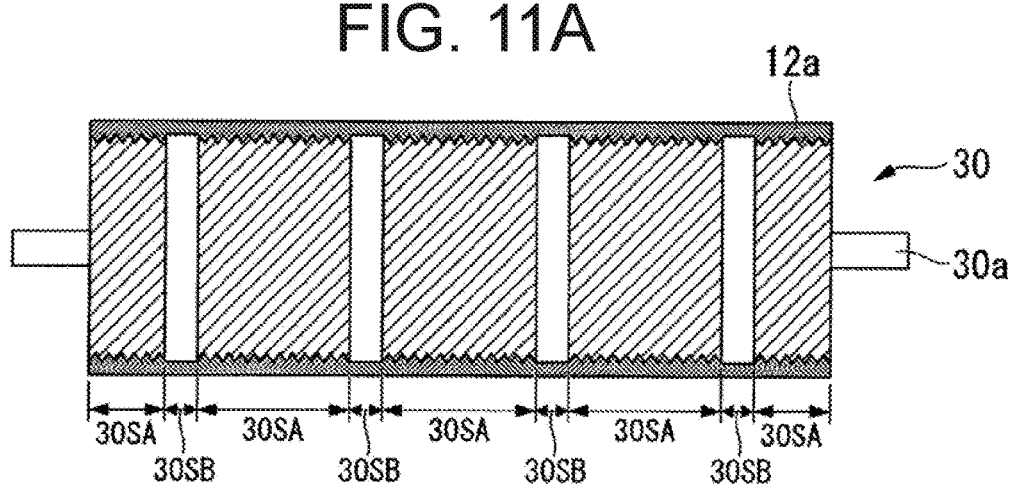
FIGS. 11(A) to 11(C) are views for describing the effect of a separator production device.
Figure 11B:
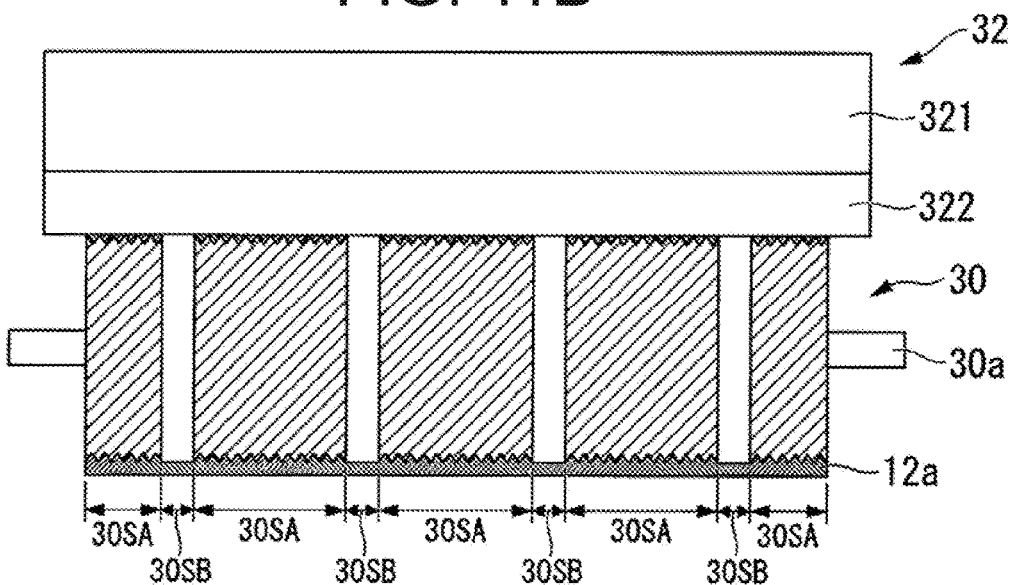
Figure 11C:
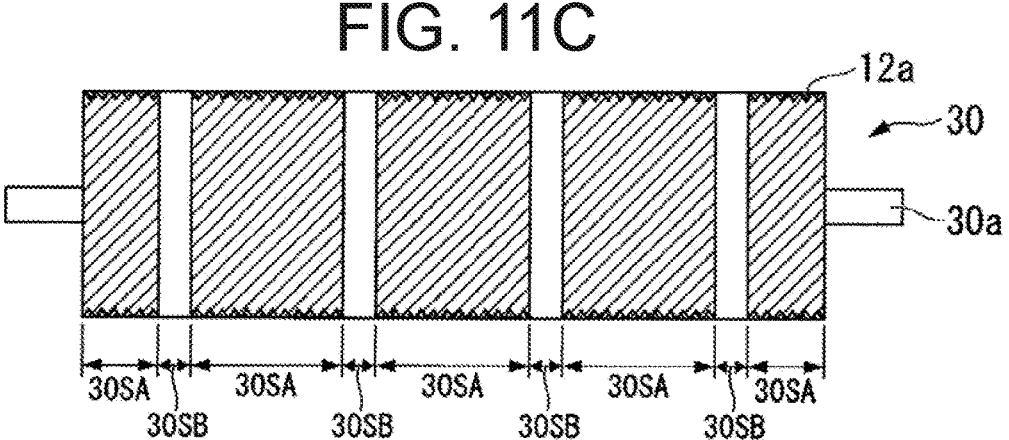

FIGS. 11(A) to 11(C) are views for describing the effect of the separator production device 1 of the present embodiment.

As illustrated in FIG. 11(A), when the coating liquid 12a is supplied to the roll member 30, the coating liquid 12a adheres not only to the processing regions 30SA, but also to the non-processing regions 30SB of the roll member 30.

When the roll member 30 is rotated in this state while pushed onto the film member 21, the coating liquid 12a is unfavorably transferred to the whole of the film member 21. In other words, the heat-resistant layer is formed not only in the layer-formed-regions, which are to be regions in each of which an electrode plate is arranged in the film member, but also the layer-nonformed-regions, which are to be regions onto each of which a separator is welded. Thus, even when separators are produced from the film member, a problem is caused such that when the separators are each subjected to welding, the thermal conduction of the separator is hindered by the heat-resistant layer in its welded portion, so that the welding is not sufficiently attained.

As illustrated in FIG. 11(B), in the present embodiment, the coating liquid 12a that has attached to the non-processing regions 30SB can be scraped by the edge portion 322 of the blade member 32.

Thus, as illustrated in FIG. 11(C), the coating liquid 12a is held only in the processing regions 30SA of the roll member 30. This makes it possible to transfer the coating liquid 12a only to desired regions of the film member 21 (the layer-formed-regions 10SA, which are to be regions where electrode plates are arranged in the film member 21).

Returning to FIG. 1, the film member 21 having the surface onto which the coating liquid 12a has been transferred by the coating device 3 is fed out through the tension rolls 8 at the downstream side of the transporting path, and then passed through a plurality of the transporting rolls 7 to be introduced into the drying/hardening unit 4.

The drying/hardening unit 4 is a unit for drying the solvent contained in the coating liquid 12a transferred onto the film member 21 to harden the binder resin, which is a solid content. By the introduction of the film member 21, which has the surface onto which the coating liquid 12a has been transferred, into the drying/hardening unit 4, the heat-resistant layer 12 is bonded firmly onto the film member 21.

The film member 21, which has the surface on which the heat-resistant layer 12 has been bonded by the drying/hardening unit 4, is transported through the plurality of the transporting rolls 7 to be introduced into an inspecting region of the inspecting unit 5.

The inspecting unit 5 is a unit for inspecting the surface state of the film member 21, on which the heat-resistant layer 12 has been bonded. The inspecting unit 5 has, for example, a camera, a memory section, and a determining section. The camera takes a photograph of the surface of the film member 21. The memory section memorizes image data of the film member 21 surface photographed through the camera. The determining section determines whether or not the heat-resistant layer 12 is formed in the desired regions of the film member 21 based on the image data.

The film member 21, the surface state of which has been inspected by the inspecting unit 5, is transported through the plurality of the transporting rolls 7, and wound onto the winding roll 6.

Figure 12A:
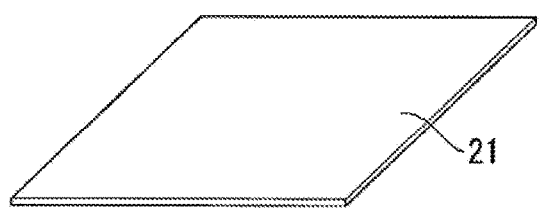
FIGS. 12(A) to 12(D) are views illustrating a process for producing separators.

FIGS. 12(A) to 12(D) are views illustrating a process for producing the separators 10 in the present embodiment. FIG. 12(A) illustrates the film member 21.

Figure 12B:
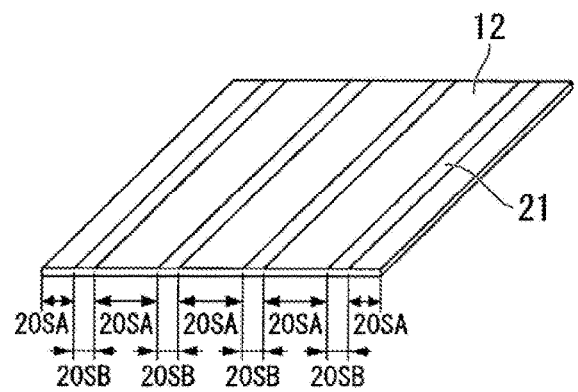

FIG. 12(B) illustrates a state that the heat-resistant layer 12 is formed on the film member 21. The film member 21, which is held on the holding roll 2, is unwound to be fed out; and as described above, the film member 21 is passed through the coating device 3 and the drying/hardening unit 4 to bond the heat-resistant layer 12 onto the front surface thereof. The film member 21 has, on the front surface thereof, layer-formed-regions 20SA each having the front surface on which the heat-resistant layer 12 is formed, and layer-nonformed-regions 20SB each having the front surface on which the heat-resistant layer 12 is not formed. The film member 21 has five layer-formed-regions 20SA and four layer-nonformed-regions 20SB. The film member 21 having the surface on which the heat-resistant layer 12 is bonded is wound onto the winding roll 6.

Figure 12C:
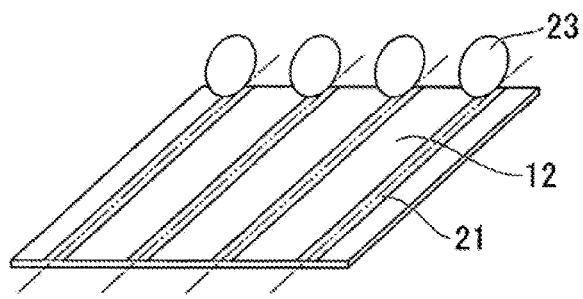

As illustrated in FIG. 12(C), cutting units 23 such as cutters are used to cut the film member 21 at the layer-nonformed-regions 20SB along the longitudinal direction.

Figure 12D:
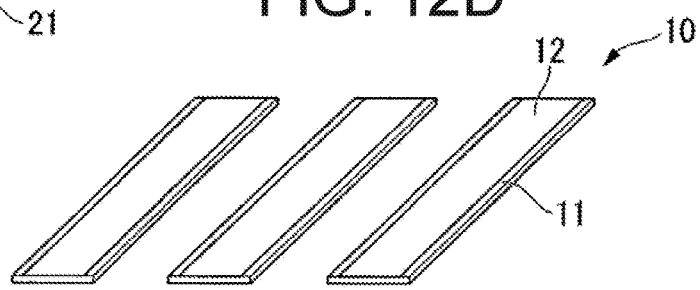

As illustrated in FIG. 12(D), in this way, the separators 10 are each formed into a strip shape. In the present embodiment, from the single film member 21, three separators 10 are obtained. In the embodiment, out of the five layer-formed-regions 20SA provided in the film member 21, two layer-formed-regions 20SA at both sides of this member are not used as the separators 10. In other words, three layer-formed-regions 20SA at the center are used as the separators 10.

When an electrode wound body to be sealed into a secondary battery is produced, the separators 10, which have been produced into the form of a band having a predetermined width, are wound together with a positive electrode and a negative electrode each made into the form of a band. The resultant is wound by a required length. The wound workpiece is then cut, and the end of the winding is fixed to produce the wound body. When a laminated type electrode, which is not a wound body, is produced, the wound workpiece is cut also in a direction orthogonal to the longitudinal direction of the separators 10. Each of the resultant cut regions is subjected to welding. Also in this case, if the cut regions are coated with the heat-resistant layer 12, the welding unfavorably becomes difficult to be conducted at a normal temperature. It is therefore preferred in the coating treatment that also in the direction orthogonal to the longitudinal direction, layer-nonformed-regions, where the heat-resistant layer 12 is not formed, are intermittently formed.

For example, a coating treatment for forming the heat-resistant layer 12 is intermittently conducted. Specifically, while the film member 21 is fed at a constant speed, timings at each of which the coating treatment for forming the heat-resistant layer 12 is not conducted are set. While the coating device 3 faces each region of the film member 21 where the heat-resistant layer 12 is not to be formed, one of the two tension rolls 8 arranged oppositely to the coating device 3 across the film member 21 is shifted toward a direction opposite to the coating device 3. In this way, the present position of the film member does not contact the roll member 30 so that the film member 21 is not coated with the coating liquid 12a. After the region of the film member 21 where the heat-resistant layer 12 is not to be formed is passed away, the arrangement of the tension roll 8 is returned to the original position, and the coating treatment is again conducted.

According to such a process, in the strip-shaped film member 21, layer-nonformed-regions are formed in both end portions and middle portions in the longitudinal direction of this member 21, and are additionally formed intermittently in the width direction. Thus, layer-formed-regions each having a rectangular shape are arranged lengthwise and breadthwise. Thereafter, the cutting units cut the middle portions along the longitudinal direction. In this way, separators in each of which the heat-resistant layer 12 is intermittently formed can be produced.

When the separators 10 are used to form electrode wound bodies, the separators 10, and positive and negative electrode plates are stacked onto each other. The stacked body is then wound by a required length while unwound. Lastly, the stacked body is cut into individuals.

As described hereinbefore, according to the roll member 30 and the separator production device 1 of the present embodiment, the amount of the coating liquid 12a held in the first processing region SA1 is smaller than that of the coating liquid 12a held in the third processing region SA3. This makes it possible to restrain the coating liquid 12a from being excessively held in the first processing region SA1 even when the coating liquid 12a flows to the one end portion E1 in the width direction of each of the processing regions 30SA in a lean manner. It is therefore possible to restrain a region of the film member 21 that corresponds to the first processing region SA1 from being excessively coated with the coating liquid 12a. In other words, it is possible to restrain the thickness of an end portion of the heat-resistant layer 12 from being excessively large in the width direction of the film member 21. Moreover, the thickness of the coating liquid 12a held in the first processing region SA1 gradually becomes smaller as a distance from the one end portion E1 in the width direction of the processing region 30SA decreases. This makes it possible to make the thickness of the coating liquid 12a held in the first processing region SA1 gentle. It is therefore possible to make gentle the thickness of the heat-resistant layer 12 formed in the region of the film member 21 that corresponds to the first processing region SA1. Thus, it is possible to provide the roll member 30 and the separator production device 1 to be capable of restraining the generation of the high-edge phenomenon and further forming the heat-resistant layer 12 evenly onto the front surface of the substrate 11.

Moreover, by the edge portion 322 of the blade member 32, the coating liquid 12a that has attached onto the non-processing regions 30SB can be scraped to remove all of the coating liquid 12a in the non-processing regions 30SB. Thus, the separator 10 can be produced having no heat-resistant layer 12 in the layer-nonformed-regions 10SB, which are regions where the separator 10 is to be subjected to welding. In short, the substrate 11 can be made naked in the layer-nonformed-regions 10SB where the separator 10 is to be subjected to welding. Thus, the separator 10 which has the heat-resistant layer 12 selectively formed in desired regions can be produced.

Furthermore, the roll member 30 has the plurality of the processing regions 30SA in the central axis 30a; thus, the coating liquid 12a can be transferred at a time onto a plurality of the layer-formed-regions 20SA of the film member 21.

Additionally, the edge portion 322 of the blade member 32 is in the form of a straight line parallel to the central axis 30a; thus, while the amount of the coating liquid 12a held in each of the processing regions 30SA of the roll member 30 is adjusted to a predetermined amount, the coating liquid 12a that adheres to the non-processing regions 30SB can be scraped.

Besides, the edge portion 322 of the blade member 32 is smaller in elastic modulus than the roll member 30; thus, in the state that the edge portion 322 is bent, the edge portion 322 can be brought into contact with the non-processing regions 30SB of the roll member 30 under pressure. Thus, the coating liquid 12a that has attached onto the non-processing regions 30SB can be sufficiently scraped.

Figure 13:
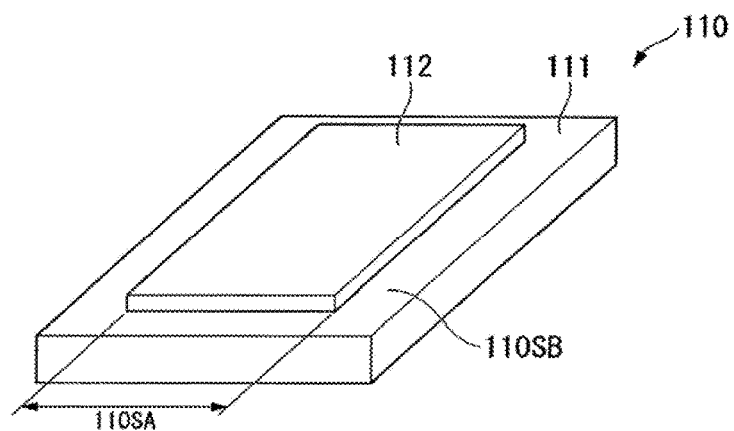
FIG. 13 is a perspective view illustrating a sheet-form separator.

In the present embodiment, the above has described the separator 10 having a strip-shaped roll as an example. However, the roll is not limited to this roll. As illustrated in FIG. 13, for example, a separator 110 in the form of a sheet is also usable. This sheet-form separator 110 is applied to a laminated type secondary battery. In FIG. 13, the dimension in the thickness direction (vertical direction in FIG. 13) of the separator 110 is enlarged. However, the dimension is actually very small relatively to the dimension in the width direction. As has been illustrated in FIG. 13, the separator 110 is in a rectangular form. The separator 110 has, in the front surface thereof, a layer-formed-region 110SA where a heat-resistant layer 112 is formed at a central portion of the front surface, and has a layer-nonformed-region 110SB where the heat-resistant layer 112 is not formed at a peripheral portion of the front surface.

Second Embodiment

Figure 14:
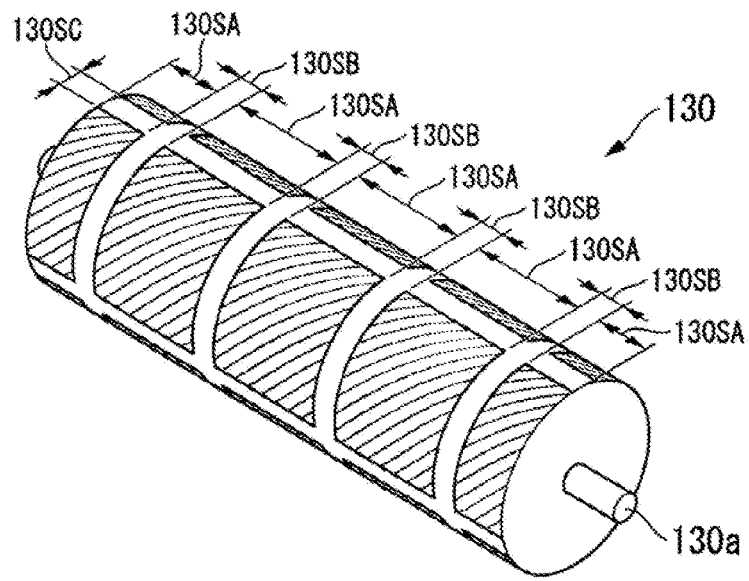
FIG. 14 is a schematic view illustrating a roll member of a second embodiment of the present invention.

FIG. 14 is a perspective view corresponding to FIG. 3(A) for illustrating a roll member 130 of a second embodiment of the present invention. As illustrated in FIG. 14, the roll member 130 of the present embodiment is different from the roll member 30 of the first embodiment in that the former has second non-processing regions 130SC in a direction parallel to a central axis 130a. The other configurations are identical with those of the above-mentioned embodiment. Thus, to elements that are identical with those in FIG. 3(A) are attached the same reference numbers or signs, respectively, and any detailed description thereon is omitted.

As illustrated in FIG. 14, the roll member 130 has, in the direction parallel to the central axis 130a, processing regions 130SA to each of which processing for holding the coating liquid 12a is applied along the circumferential direction, and first non-processing regions 130SB to each of which no processing for holding the coating liquid 12a is applied. Furthermore, the roll member 130 has the second non-processing regions 130SC, to each of which no processing for holding the coating liquid 12a is applied, also in the direction parallel to the central axis 130a and orthogonal to the processing regions 130SA. In short, the processing regions 130SA in the present embodiment are each divided into plural (three) sections in the circumferential direction of the roll member 130 by the second non-processing regions 130SC.

This configuration makes it possible to intermittently form the non-processing regions, where the coating liquid 12a is not coated in a coating treatment, also in the direction orthogonal to the longitudinal direction.

In the present embodiment, the description has been made about an example in which each of the processing regions 130SA is divided into three parts by the second non-processing regions 130SC in the circumferential direction of the roll member 130. However, the manner of the division is not limited to this manner. For example, the processing region 130SA may be divided into two parts or into four or more parts in the circumferential direction of the roll member 130.

By varying the diameter or the length of the roll member 130 appropriately, layer-formed-regions can be obtained with a desired pattern.

FIGS. 15(A) to 15(D) are views illustrating a process for producing the separators 110 when the roll member 130 of the present embodiment is used.

Figure 15A:
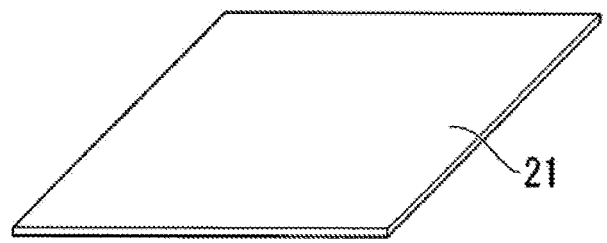
FIGS. 15(A) to 15(D) are views illustrating a process for producing separators.

FIG. 15(A) illustrates the film member 21.

Figure 15B:
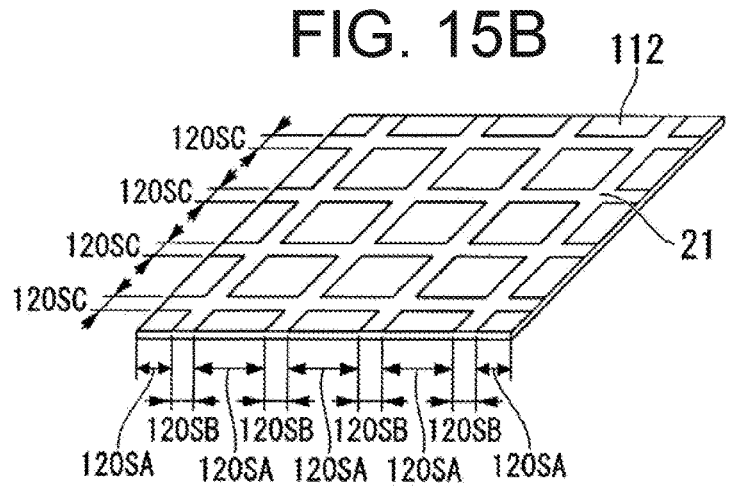

FIG. 15(B) illustrates a state that a heat-resistant layer 112 is formed on the film member 21. The film member 21, which is held on the holding roll 2, is unwound to be fed out; and as described above, the film member 21 is passed through the coating device having the roll member 130 of the present embodiment, and the drying/hardening unit 4 to firmly bond the heat-resistant layer 112 onto the front surface thereof. The film member 21 has the layer-formed-regions 120SA each having the front surface on which the heat-resistant layer 112 is formed, first layer-nonformed-regions 120SB each having the front surface on which the heat-resistant layer 112 is not formed, and the second layer-nonformed-regions 120SC. The film member 21 has 25 layer-formed-regions 120SA, four rows of second layer-nonformed-regions 120SB which are parallel to the longitudinal direction of the film member 21, and four rows of second layer-nonformed-regions 120SC which are parallel to the width direction of the film member 21. The film member 21, which has the front surface onto which the heat-resistant layer 112 is bonded, is wound onto the winding roll 6.

Figure 15C:
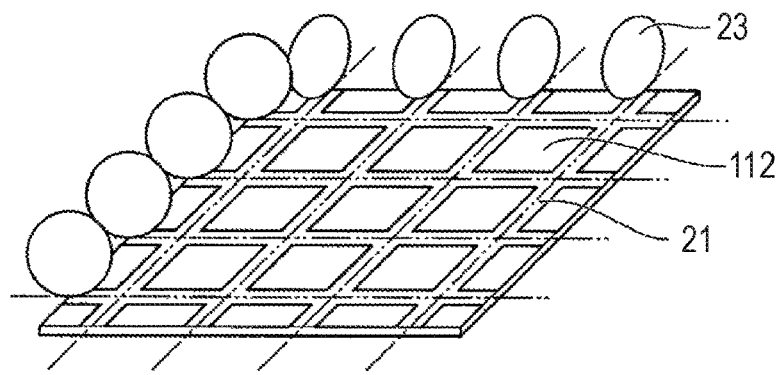

As illustrated in FIG. 15(C), the cutting units 23, such as cutters, are used to cut the film member 21 along each of the longitudinal direction and the width direction.

Figure 15D:
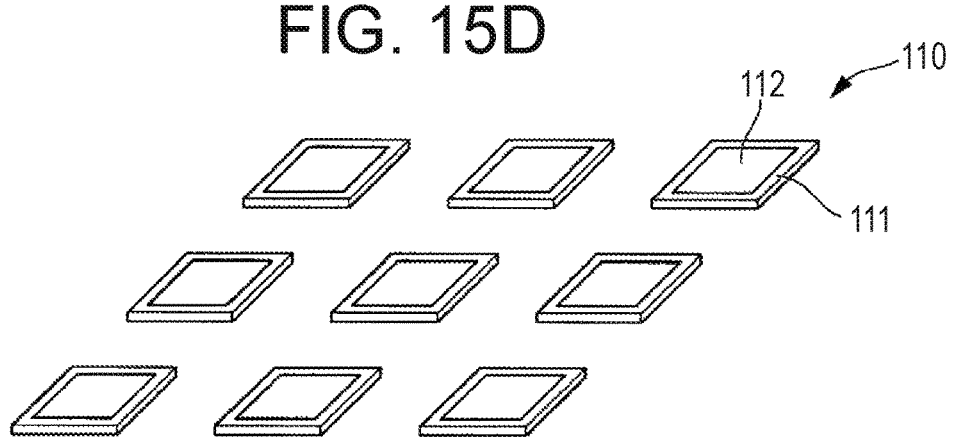

As illustrated in FIG. 15(D), in this way, the separators 110, which are each in a film form, are produced. In the present embodiment, from the single film member 21, nine separators 110 are obtained. In the embodiment, out of the 25 layer-formed-regions 120SA provided in the film member 21, 16 layer-formed-regions 120SA in the outer peripheral portion of this member are not used as the separators 110. In other words, 9 layer-formed-regions 120SA at the center are used as the separators 110.

The following will describe a secondary battery production device 100 for producing a secondary battery by use of the film-formed separators 110 with reference to an example.

(Secondary Battery Production Device)

Figure 16:
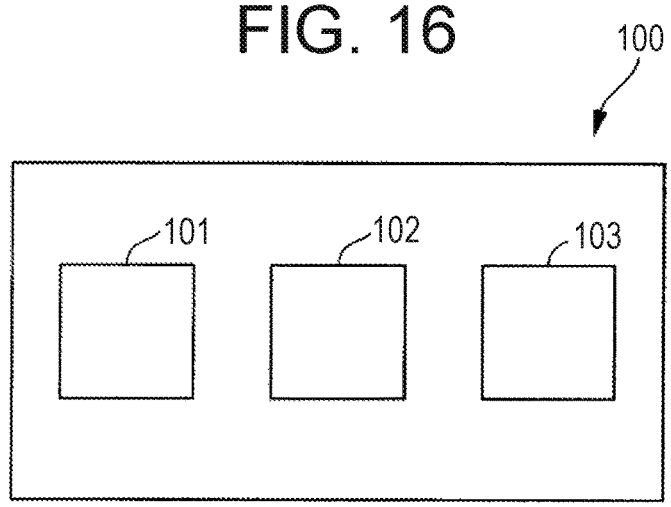
FIG. 16 is a schematic view illustrating a secondary battery production device of the present invention.

FIG. 16 is a schematic view illustrating the secondary battery production device 100 of the present invention.

The secondary battery production device 100 of the present invention is a device for producing a secondary battery including a positive electrode plate, a negative electrode plate, and pairs of separators. In the secondary battery, the pairs of the separators are members which sandwiches the positive electrode plate and the negative electrode plate therebetween, respectively.

As illustrated in FIG. 16, the secondary battery production device 100 of the present invention has a separator production device 101, a stacking device 102, and a heating device 103.

The separator production device 101 is a device for producing separators. The separator production device 1 used is a device in which the roll member 130 of the second embodiment is applied to the separator production device 1 described in the first embodiment.

The separator production device 101 transfers the coating liquid 12a held in the processing regions 130SA of the roll member 130 onto a central portion of a substrate 111 of each of the separators 110, thereby producing each of the separators 110 so as to have, in a central portion thereof, the layer-formed-region 110SA where the heat-resistant layer 12 is formed and to have, in a peripheral edge portion thereof, the layer-nonformed-region 110SB where the heat-resistant layer 12 is not formed.

The stacking device 102 is a device for sandwiching a positive electrode plate or a negative electrode plate between the pair of separators 110. The stacking device 102 arranges the layer-formed-regions 110SA of the pair of separators 110 so as to be superimposed onto the positive electrode plate or the negative electrode plate.

The heating device 103 is a device for welding the pair of separators 110 onto each other. The heating device 103 heats the respective layer-nonformed-region 110SB of the separators 110, which is not superimposed onto the positive electrode plate or the negative electrode plate, to weld the paired separators 110 onto each other.

Figure 17:
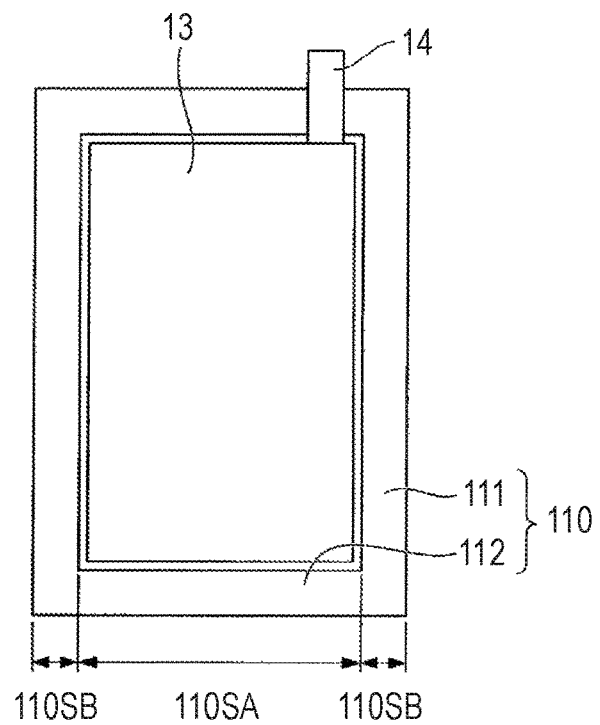
FIG. 17 is a schematic view illustrating a main portion of a secondary battery.

FIG. 17 is a schematic view illustrating a main portion of a secondary battery 50.

As illustrated in FIG. 17, a positive electrode plate 13 is arranged in the layer-formed-region 110SA of the separator 110. A tab 14 is fitted to the positive electrode plate 13. The tab 14 is partially made naked outside from the separator 110. The layer-nonformed-region 110SB of the separator 110 is a region which is to be subjected to thermal melt-bonding.

Figure 18:
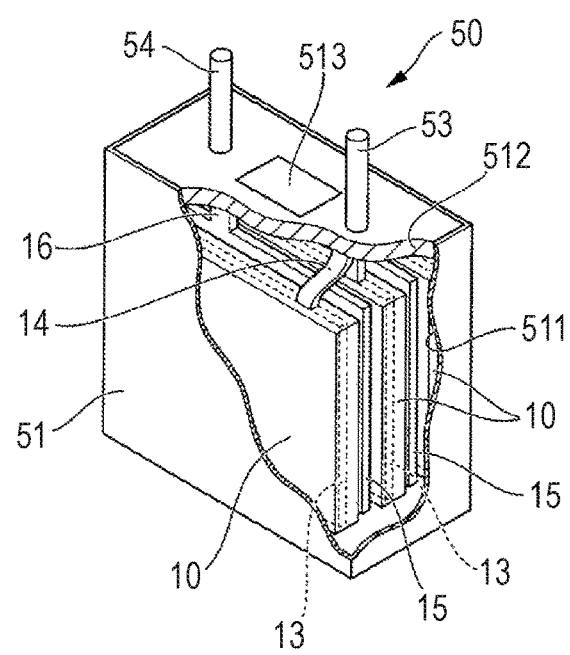
FIG. 18 is a partially cutaway perspective view of the secondary battery.

FIG. 18 is a partially cutaway perspective view of the secondary battery 50.

As illustrated in FIG. 18, the secondary battery 50 has a container 51 into which an electrolytic solution is stored. The secondary battery 50 is, for example, a lithium ion secondary battery. The container 51 is, for example, a hollow container made of aluminum. The external shape thereof is a substantially prism form (substantially rectangular parallelepiped form). The container 51 has a container body 511 having an opening, and a lid 512 which closes this opening to be joined with the container body 511.

Electrode terminals 53 and 54 are fitted to the lid 512. For example, the electrode terminal 53 is a positive electrode terminal, and the electrode terminal 54 is a negative electrode terminal. Into the container 51, a plurality of the electrodes 13, a plurality of electrodes 15 and a plurality of the separators 10 are housed. For example, the electrode plates 13 are positive electrode plates, and the electrode plates 15 are negative electrode plates. The plurality of the electrode plates 13 and electrode plates 15 are repeatedly arranged in such a manner that the positive electrode plates and the negative electrode plates are alternately arranged.

The electrode plate 13 or the electrode plate 15 is sandwiched between the pair of separators 10. In this way, the electrode plate 13 does not directly contact the electrode plate 15. The separators 10 are made of, for example, a porous insulator, and transmit an electrolytic component such as lithium ions. Actually, a structural body in which the positive electrode plate 13 is sandwiched between the pair of separators 10, and a structural body in which the negative electrode plate 15 is sandwiched between the paired separators 10 are stacked onto each other alternately to configure a stacked body. The secondary battery 50 has a structure in which the stacked body is housed in the container 51. The electrolytic solution is stored so as to contact the electrode plates 13 and 15 inside the container 51.

The secondary battery 50 is obtained by, for example, the following method: Initially, the positive electrode plates 13 and the negative electrode plates 15 are prepared. Each of the positive electrode plates 13, as well as each of the negative electrode plates 15, is sandwiched between the pair of separators 10, and then the resultant sandwiched bodies are stacked onto each other to form a stacked body. Next, the stacked body is held into the container 51, and the container 51 is sealed up. For example, the stacked body is inserted into a container body 511. The positive electrode plates 13 are electrically connected to the positive electrode terminal 53, and further the negative electrode plates 15 are electrically connected to the negative electrode terminal 54. The lid 512 is then joined to the container body 511 by, for example, welding. An electrolytic solution is then injected into the container 51, and the container 51 is sealed up. In this way, the secondary battery 50 is obtained.

The above has described preferred embodiment examples according to the present embodiments with reference to the attached drawings. Needless to say, however, the present invention is not limited to these examples. The various shapes and combinations, and others of the individual constituting members demonstrated in the above-mentioned embodiment examples are each a mere example, and may be variously changed in accordance with a design request and others within a range not departing from the gist of the present invention.

LIST OF REFERENCE SIGNS 1 and 101: separator production device, 10 and 110: separator, 11 and 111: substrate, 12 and 112: heat-resistant layer, 3: coating device, 4: drying/hardening unit (drying unit), 12a: coating liquid, 13: positive electrode plate, 15: negative electrode plate, 30 and 130: roll member, 30a and 130a: central axis, 30SA and 130SA: processing region, 30SB: non-processing region, 130SB: first non-processing region, 130SC: second non-processing region, 31: supplier, 32: blade member, 50: secondary battery, 100: secondary battery production device, 102: stacking device, 103: heating device, SA1: first processing region, SA2: second processing region, SA3: third processing region, SA4: fourth processing region, d: groove depth, E1: one end portion in width direction of processing region, E2: other end portion in width direction of processing region, L: first length, and L2: second length.

INDUSTRIAL APPLICABILITY

The present invention makes it possible to provide a roll member, a coating device, a separator production device, and a secondary battery production device that are capable of restraining the generation of a high-edge phenomenon and further forming a coated film evenly onto a surface of a substrate.

The invention claimed is:

1. A method for producing a separator comprising laminating a heat-resistant layer over a substrate in a separator production device, the separator production device comprising:
   a coating device for coating a film member with a coating liquid, the coating device comprising:
      a roll member rotatably arranged around a central axis, the roll member having an outer circumferential surface in which a plurality of grooves are formed, wherein
      the plurality of grooves are arranged at an angle relative to a direction parallel to a central axis of the roll member;
      in the outer circumferential surface of the roll member, there are provided a processing region where the plurality of grooves are formed and a non-processing region where the plurality of grooves are not formed;
      a plurality of rows of the processing region and a plurality of rows of the non-processing region are arranged alternately along the direction parallel to the central axis;
      the plurality of rows of the non-processing region is arranged at a direction orthogonal to the direction parallel to the central axis;
      the processing region has a first processing region provided in one end portion in a width direction of the processing region parallel to the central axis, a second processing region provided in the other end portion in the width direction of the processing region, and a third processing region that is a processing region other than the first and second processing regions;
      grooves in the third processing region are even in depth;
      grooves in the first processing region are smaller in depth than the grooves in the third processing region;

the depth of the grooves in the first processing region gradually decreases as the distance from the one end portion in the width direction of the processing region decreases;

grooves in the second processing region are smaller in depth than the grooves in the third processing region;

the depth of the grooves in the second processing region gradually decreases as the distance from the other end portion in the width direction of the processing region decreases; and a first length that is the length of the first processing region in the direction parallel to the central axis is different from a second length that is the length of the second processing region in the direction parallel to the central axis;

a supplier for supplying the coating liquid to an outer circumferential surface of the roll member; and a blade member for scraping a surplus of the coating liquid that has attached to the outer circumferential surface of the roll member, wherein the blade member is configured to come into contact with the processing region and the non-processing region of the roll member, thereby scraping a surplus of the coating liquid that has attached to the processing region, and further scraping the coating liquid that has attached to the non-processing region to remove the whole of the coating liquid in the non-processing region; and a drying device for drying a coating liquid containing a material for forming the heat-resistant layer and transferred to a film member that is to become the substrate with the coating device.

2. The method for producing a separator according to claim 1, wherein a tip portion of the blade member, the tip portion being to come into contact with the roll member, is in the form of a straight line parallel to the central axis.

3. The method for producing a separator according to claim 1, wherein the blade member is smaller in elastic modulus than the roll member.

4. The method for producing a separator according to claim 3, wherein the roll member is made of a metallic material, and the blade member is made of a resin material.

5. The method for producing a separator according to claim 1, wherein the roll member satisfies the following expression (1):

$$50/3 \leq (L/d) \leq 1000/3 \quad (1)$$

wherein d represents the depth of a groove formed in the first processing region and located farthest away from the one end portion of the first processing region, and L represents the length of the first processing region in the direction parallel to the central axis.

6. A method for producing a secondary battery comprising a positive electrode plate, a negative electrode plate, and a pair of separators that sandwich the positive electrode plate or the negative electrode plate therebetween, comprising preparing the pair of separators, stacking the pair of separators and heating the pair of separators to weld the pair of separators to each other in a secondary battery production device, secondary battery production device comprising:

a separator production device comprising:
a coating device for coating a film member with a coating liquid, the coating device comprising:
a roll member rotatably arranged around a central axis, the roll member having an outer circumferential surface in which a plurality of grooves are formed, wherein the plurality of grooves are arranged at an angle relative to a direction parallel to a central axis of the roll member;

in the outer circumferential surface of the roll member, there are provided a processing region where the plurality of grooves are formed and a non-processing region where the plurality of grooves are not formed;

a plurality of rows of the processing region and a plurality of rows of the non-processing region are arranged alternately along the direction parallel to the central axis;

the plurality of rows of the non-processing region is arranged at a direction orthogonal to the direction parallel to the central axis;

the processing region has a first processing region provided in one end portion in a width direction of the processing region parallel to the central axis, a second processing region provided in the other end portion in the width direction of the processing region, and a third processing region that is a processing region other than the first and second processing regions;

grooves in the third processing region are even in depth;

grooves in the first processing region are smaller in depth than the grooves in the third processing region;

the depth of the grooves in the first processing region gradually decreases as the distance from the one end portion in the width direction of the processing region decreases;

grooves in the second processing region are smaller in depth than the grooves in the third processing region;

the depth of the grooves in the second processing region gradually decreases as the distance from the other end portion in the width direction of the processing region decreases; and a first length that is the length of the first processing region in the direction parallel to the central axis is different from a second length that is the length of the second processing region in the direction parallel to the central axis;

a supplier for supplying the coating liquid to an outer circumferential surface of the roll member; and a blade member for scraping a surplus of the coating liquid that has attached to the outer circumferential surface of the roll member, wherein the blade member is configured to come into contact with the processing region and the non-processing region of the roll member, thereby scraping a surplus of the coating liquid that has attached to the processing region, and further scraping the coating liquid that has attached to the non-processing region to remove the whole of the coating liquid in the non-processing region; and a drying device for drying a coating liquid containing a material for forming the heat-resistant layer and transferred to a film member that is to become the substrate with the coating device;

a stacking device which sandwiches the positive electrode plate or the negative electrode plate between the pair of separators produced with the separator production device; and a heating device which heats peripheral edge portions of the pair of separators sandwiching the positive electrode plate or the negative electrode plate therebetween, to weld the paired separators to each other; wherein the separator production device is a device with which the coating liquid held in the processing region of the roll member is transferred to a central portion of the substrate of each of the separators and thereby separators are produced, the separators each having, in a central portion thereof, a layer-formed-region in which the heat-resistant layer is formed and further having, in a peripheral edge portion, a layer-nonformed-region in which the heat-resistant layer is not formed;

the stacking device is a device which arranges the pair of separators such that the layer-formed-regions of the pair of separators are superimposed on the positive electrode plate or the negative electrode plate; and the heating device is a device which heats the layer-nonformed-regions of the separators, each of the regions not being superimposed on the positive electrode plate or the negative electrode plate, thereby welding the pair of separators to each other.

7. The method for producing a secondary battery according to claim 6, wherein a tip portion of the blade member, the tip portion being to come into contact with the roll member, is in the form of a straight line parallel to the central axis.

8. The method for producing a secondary battery according to claim 6, wherein the blade member is smaller in elastic modulus than the roll member.

9. The method for producing a secondary battery according to claim 8, wherein the roll member is made of a metallic material, and the blade member is made of a resin material.

10. The method for producing a secondary battery according to claim 6, wherein the roll member satisfies the following expression (1):

$$50/3 \leq (L/d) \leq 1000/3 \tag{1}$$

wherein d represents the depth of a groove formed in the first processing region and located farthest away from the one end portion of the first processing region, and L represents the length of the first processing region in the direction parallel to the central axis.

* * * * *